(No Model.)

G. E. NEUBERTH.
MECHANICAL MOVEMENT.

No. 584,010. Patented June 8, 1897.

WITNESSES:
Wm. H. Canfield Jr.

INVENTOR:
GEORGE E. NEUBERTH,
BY Fred't E. Fraentzel,
ATTORNEY
UNITED STATES PATENT OFFICE.

GEORGE E. NEUBERTH, OF NEWARK, NEW JERSEY.

MECHANICAL MOVEMENT.

SPECIFICATION forming part of Letters Patent No. 584,010, dated June 8, 1897.

Application filed May 12, 1896. Serial No. 591,268. (No model.)

*To all whom it may concern:*

Be it known that I, GEORGE E. NEUBERTH, a citizen of the United States, residing at Newark, in the county of Essex and State of New Jersey, have invented certain new and useful Improvements in Mechanical Movements; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in mechanical movements which are especially applicable to the axle or spindle of a bicycle-wheel or other suitable vehicle; and the invention has for its primary object to provide a device whereby the number of revolutions of the main shaft are greatly increased, preferably in the ratio of one turn of the pedal-shaft spindle to two turns of the sprocket-wheel and three turns of the gear-wheel on the main axle or spindle, thereby providing a means for producing increased power and increased speed, especially in velocipedes, by the same number of revolutions now ordinarily made by the pedal-shaft which drives the said sprocket-wheel on the rear axle of the bicycle by means of the usual form of link chain.

The invention therefore consists in the novel construction of mechanical movement herein set forth, comprising therein an arrangement of gear mechanism connected with the main axle or spindle and its sprocket-wheel actuated by a link chain, pinions in engagement with said gear mechanism, and pawls connected with said pinions and also actuated by the link chain to produce increased revolutions of said main axle or spindle in the ratio of two to three or any other suitable ratio while maintaining the ordinary and normal number of revolutions of the pedal or crank shaft which drives the same.

The invention furthermore consists in such details of construction and arrangements of parts as will be hereinafter fully described, and finally embodied in the clauses of the claim.

In describing this invention reference is to be had to the accompanying drawings, forming part of this specification, in which like letters of reference indicate corresponding parts in all of the views.

Figure 1:
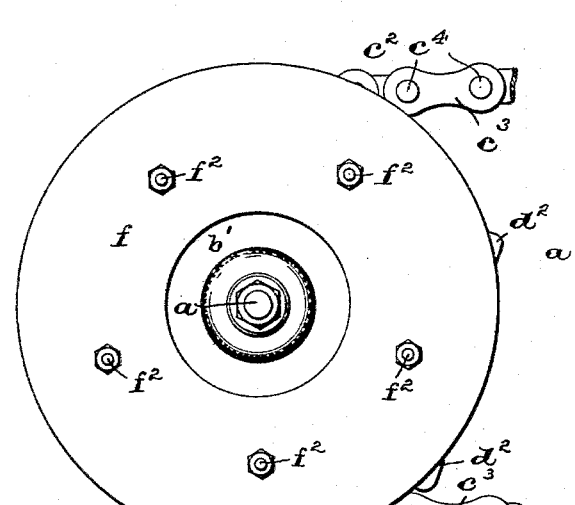
Figure 3:
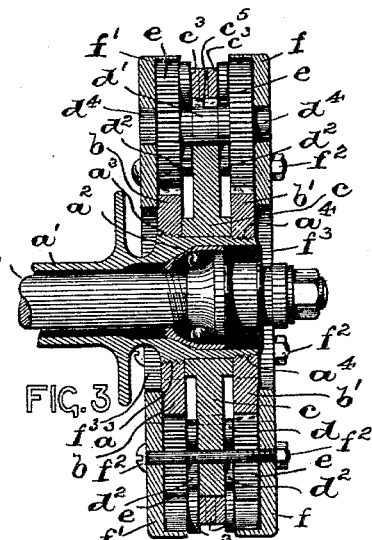
Figure 2:
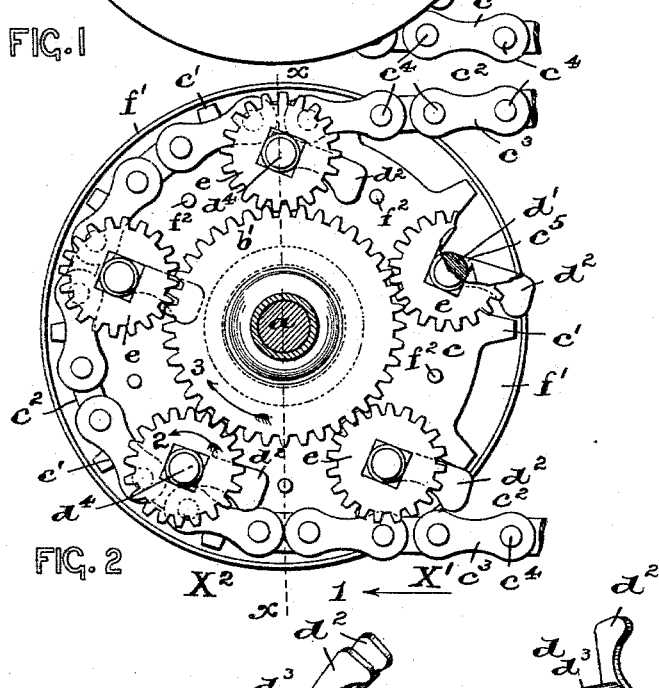
Figure 4:
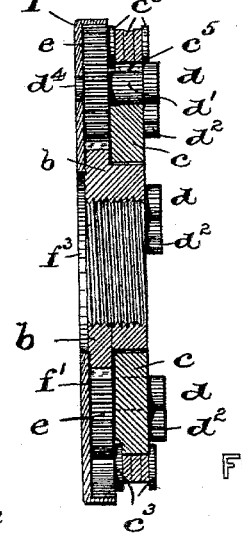
Figures 5, 6:

Figure 1 is a side view of the device embodying the principles of my invention, the mechanism being inclosed in a casing. Fig. 2 is a similar view of the device with the cover of the casing removed to clearly illustrate the arrangement and construction of the parts comprised in my invention. Fig. 3 is a vertical cross-section taken on line $x$ in Fig. 2, but also illustrating the cover in position and the same being represented in cross-section. Fig. 4 is a view similar to that illustrated in Fig. 3, but of a slightly-modified form of construction. Fig. 5 is a perspective view of one of the forms of actuating-pawls employed in connection with the construction represented in Figs. 2 and 3, and Fig. 6 is a similar view of an actuating-pawl used in connection with the construction illustrated in Fig. 4.

In said drawings, $a$ is the usual construction of axle or spindle of the rear wheel of a bicycle arranged in a tubular hub $a'$ and provided with any well-known form of construction of ball-bearing $a^2$, substantially as illustrated in Fig. 2. Said hub $a'$ is provided with screw-threads $a^3$ and $a^4$, onto which are firmly screwed a pair of gear-wheels $b$ and $b'$, so that they turn with said hub to operate the spindle of the rear wheel. Loosely and rotatively arranged on the hub $a'$ and between said gear-wheels $b$ and $b'$ is a suitable sprocket-wheel $c$, having the sprockets $c'$, and a link chain or belt $c^2$, passing over the same to actuate said sprocket-wheel, said chain or belt consisting of the usual forms of links $c^3$, which are pivotally connected, as at $c^4$. Said sprocket-wheel $c$, as will be seen from Figs. 2 and 3, is provided with any desirable number of slots $c^5$ or other suitable openings, in which are loosely and rotatively fitted the bearing portions of certain operating-pawls $d$. Said pawls comprise therein a pair of arms $d^2$ on both sides of a cylindrical portion $d'$, which forms the bearing portion to be fitted into the slotted or other suitable openings $c^5$ in said sprocket-wheel $c$. On opposite sides of the said arms $d^2$ are a pair of squared or other suitable holding portions $d^3$, on which are firmly secured certain pinions or gear-wheels $e$. The ends $d^4$ of said pawl devices $d$ are cylindrical and extend into openings in a pair of covers $f$ and $f'$, closely arranged against the opposite sides or faces of the two gear-wheels $b$ and $b'$ and secured in such positions by bolts $f^2$ in the sprocket-wheel $c$, substantially as shown in the several figures of the drawings.

As it is my intention to produce a greater number of revolutions of the hub $a'$ on the spindle $a$ than the number of revolutions of the sprocket-wheel $c$, arranged thereon, and also of the several parts connected therewith, said plates or covers $f$ and $f'$ have the central openings $f^3$ and are not directly connected with the hub $a'$ or with the spindle $a$, whereby they are free of the hub $a'$, and the revolutions of the one are therefore independent of those of the other.

The action of the several parts is as follows: Suppose the device, as in this instance, to be placed on the hub of the rear wheel of a bicycle and the sprocket or link chain $c$ to be operated from a sprocket-wheel on the crank or pedal shaft of the vehicle. The chain $c^2$ will move in the direction of the arrow 1 in Fig. 2, causing the sprocket-wheel $c$ and the plates or covers $f$ and $f'$ to rotate in the same direction without actuating the hub $a'$, to which the spokes of the rear wheel are secured in any well-known manner. The rotation of the said sprocket-wheel $c$ causes the pinions $e$ to move with the same, but without any rotation on their own axes, until the free ends of the pawl-arms $d^2$ come in operative contact with the links of the chain $c$ at the point $X'$, and in passing from this point to the point $X^2$ (see Fig. 2) said pinions or gear-wheels $e$ receive one-fifth of a turn on their own axes, moving in the direction of arrow 2, or, in other words, the pawl $d^2$ will rotate on its journal portion $d'$ in the openings $c^5$ in said sprocket-wheel $c$, and thus have an independent rotation on its own axis, while at the same time moving with the sprocket-wheel $c$ in the manner of a sun-and-planet gear. This one-fifth of a turn of the said gears or pinions $e$ causes the operation of the two gears $b$ and $b'$, made fast on the hub $a'$, and there being five pinions $e$ for each gear $b$ and $b'$ on said hub the combined result of the one-fifth turn of each pinion $e$ will be to cause one complete revolution of each gear $b$ and $b'$ in the direction of arrow 3, and while the sprocket-wheel $c$ makes two complete revolutions this gear mechanism is timed to produce three revolutions of the gears $b$ and $b'$ during the same time. The sprocket-wheel on the pedal-shaft being arranged to make but one revolution to two revolutions of the sprocket-wheel on the spindle of the rear wheel it will be evident that the ratio of the sprocket-wheel revolution on the pedal-shaft to the sprocket-wheel on the rear wheel-spindle will be one to three, and I therefore obtain a much greater speed over the constructions of speed-gearings now ordinarily used on bicycles. The operative contact of the several arms $d^2$ on the pinions with the links of the chain or belt $d^2$ is made so rapidly that the gears $b$ and $b'$ will turn without interruption and without any possible jerky movement.

From the above description and inspection of Fig. 2 of the drawings it will be seen that I employ two pairs of gears on the hub $a'$, the pinions $e$ also being used in pairs.

In Fig. 4 I have illustrated a construction in which I use but one gear $b$ and one set of pinions $e$, the duplication of the arms or pawls $d^2$ and other parts of the pawl devices (illustrated in Fig. 5) being dispensed with and the pawl devices $d$ being constructed as indicated in Fig. 4. The operation of the parts illustrated in said Fig. 4 being the same as that of the parts represented in Fig. 3 and as hereinabove set forth the same need not be further described in detail here.

It will be evident that I may vary the arrangement and combinations of the several parts herein shown without departing from the scope of my present invention. Hence I do not limit my invention to the precise details of the construction and arrangements of the parts as herein shown and described.

Having thus described my invention, what I claim is—

1. The combination, with a hub, of a sprocket-wheel loosely, but rotatively, arranged thereon and a sprocket-chain passing over said sprocket-wheel, a gear-wheel secured on said hub, pinions rotatively arranged on the face of said sprocket-wheel, said pinions meshing with said gear-wheel on the hub, means for operating said sprocket-chain, and a pawl connected with each pinion, adapted to be actuated by said sprocket-chain, to cause said pinions to operate the gear-wheel on said hub, substantially as and for the purposes set forth.

2. The combination, with a hub, of a sprocket-wheel loosely, but rotatively, arranged thereon, a gear-wheel secured on said hub, pinions rotatively arranged on the face of said sprocket-wheel, said pinions meshing with said gear-wheel on the hub, means for operating said sprocket-wheel, and mechanism connected with each pinion, adapted to be actuated by said sprocket-wheel-operating means, to cause said pinions to operate the gear-wheel on said hub, consisting, essentially, of pawl devices, each comprising a bearing-surface $d'$, pawl-arm $d^2$, a holding portion $d^3$ on which the pinion is arranged, and a bearing portion $d^4$, substantially as and for the purposes set forth.

3. The combination, with a hub, of a sprocket-wheel loosely, but rotatively, arranged thereon, bearing portions, as $c^5$, in said sprocket-wheel, pawl devices in said bearing portions, each comprising, a bearing-surface $d'$, pawl-arm $d^2$, and a holding portion, as $d^3$, pinions on said holding portions of the pawl devices, a gear-wheel secured on said hub meshing with said pinions, and means for operating said sprocket-wheel, and at the same time adapted to actuate said pawl devices, substantially as and for the purposes set forth.

4. The combination, with a hub, of a sprocket-wheel loosely, but rotatively, arranged thereon, a pair of gear-wheels $b$ and $b'$ secured on said hub, pinions rotatively arranged on the opposite faces of said sprocket-wheel, meshing with said gears $b$ and $b'$, means for operating said sprocket-wheel, and mechanism connected with each pinion, adapted to be actuated by said sprocket-wheel-operating means, to cause said pinions to operate the gear-wheels on said hub, consisting, essentially, of pawl devices, each comprising a bearing-surface $d'$, a pair of pawl-arms $d^2$ and holding portions $d^3$ on which said pinions are arranged, substantially as and for the purposes set forth.

5. The combination, with a hub, of a sprocket-wheel loosely, but rotatively, arranged thereon, a pair of gear-wheels $b$ and $b'$, secured on said hub, pinions rotatively arranged on the opposite faces of said sprocket-wheel, meshing with said gears $b$ and $b'$, means for operating said sprocket-wheel, and mechanism connected with each pinion, adapted to be actuated by said sprocket-wheel-operating means, to cause said pinions to operate the gear-wheels on said hub, consisting, essentially, of pawl devices, each comprising a bearing-surface $d'$, a pair of pawl-arms $d^2$, holding portions $d^3$ on which said pinions are arranged, and bearing portions $d^4$, plates or covers $f$ and $f'$, and means for securing said plates in place over said mechanism, substantially as and for the purposes set forth.

In testimony that I claim the invention set forth above I have hereunto set my hand this 9th day of May, 1896.

GEORGE E. NEUBERTH.

Witnesses:
FREDK. C. FRAENTZEL,
WM. H. CAMFIELD, Jr.